No. 669,645. Patented Mar. 12, 1901.
F. A. KELLEY.
VELOCIPEDE DRIVING MECHANISM.
(Application filed Nov. 1, 1900.)
(No Model.)
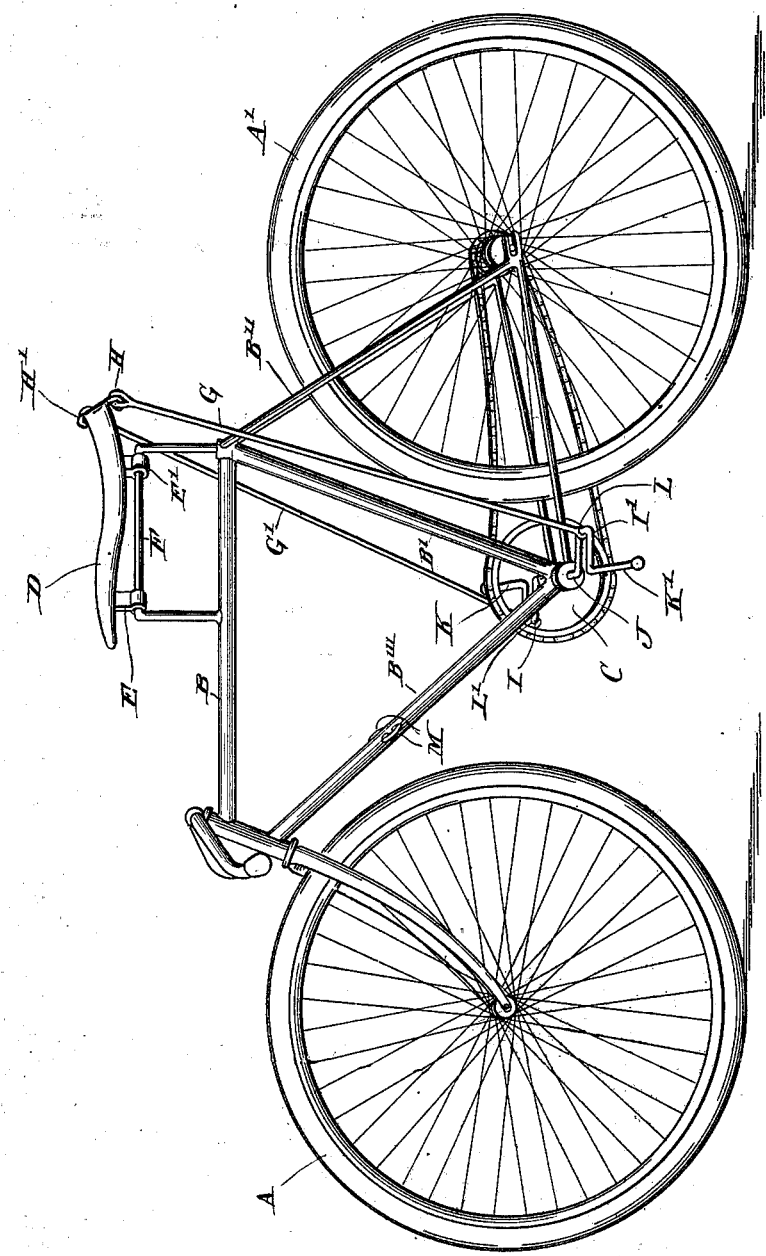
Witnesses:
Geo. M. McSlow
Frank H. Baugham
Inventor:
Frank A. Kelley

UNITED STATES PATENT OFFICE.

FRANK ANSON KELLEY, OF SUSANVILLE, CALIFORNIA.

VELOCIPEDE DRIVING MECHANISM.

SPECIFICATION forming part of Letters Patent No. 669,645, dated March 12, 1901.

Application filed November 1, 1900. Serial No. 35,188. (No model.)

*To all whom it may concern:*

Be it known that I, FRANK ANSON KELLEY, a citizen of the United States, residing at Susanville, in the county of Lassen, State of California, have invented a new and useful Improvement in Velocipede Driving Mechanism; and I do hereby declare the following to be a true and correct description of the same, reference being had to the annexed drawing, which forms a part hereof, and in which similar letters refer to similar parts throughout the entire view.

The drawing is a vertical side view of the entire device as and when attached to said vehicles.

The object of my invention is to so construct and arrange a seat or seats and its connecting operating mechanism for each and all of said vehicles that the weight of the rider will propel entirely or materially assist in propelling or running the same, and thereby making it much easier to run, faster in speed, and but little more expensive.

In the drawing, let A A' represent the wheels of a bicycle or other vehicle; B, B', and B" its frame, and C its sprocket-wheel or gears; D its seat, which seat is provided on its under part and at or near its lengthwise center with two or more eyelets or a sheave E E' and through which a bar or shaft F freely passes and is attached to the bicycle-frame and upon which the seat rests and tilts or rocks.

G G' are two driving-rods hinged to the seat on its under outside part at or near its rear end by a ring or universal joint H H'. These rods extend downward and connect onto the cranks I I' and freely revolve around the same by means of holes on boxes L L', which cranks form a part of the pedal-shaft J, and both rods being of the same length they automatically descend and ascend to revolve the pedals K K'. These rods may be detached from their cranks, brought forward, and fastened to the frame B''' at M when not desired to be used for power purposes, and thus converted into braces for holding the seat in place level and secure.

What I claim as new and useful, and desire to secure by Letters Patent, is—

A saddle pivoted to turn laterally on a support above and in the vertical plane of a bicycle, in combination with two rods jointed at one end to the pedal-shaft crank and at the other to a cross-bar on the saddle, by a universal joint; whereby the bicycle may be propelled in the manner described.

FRANK ANSON KELLEY.

Witnesses:
GEO. L. TOMB,
LOUIS D. HALL.